Oct. 8, 1963
J. E. JAPKA
3,106,493
THERMOCOUPLE
Filed May 5, 1961
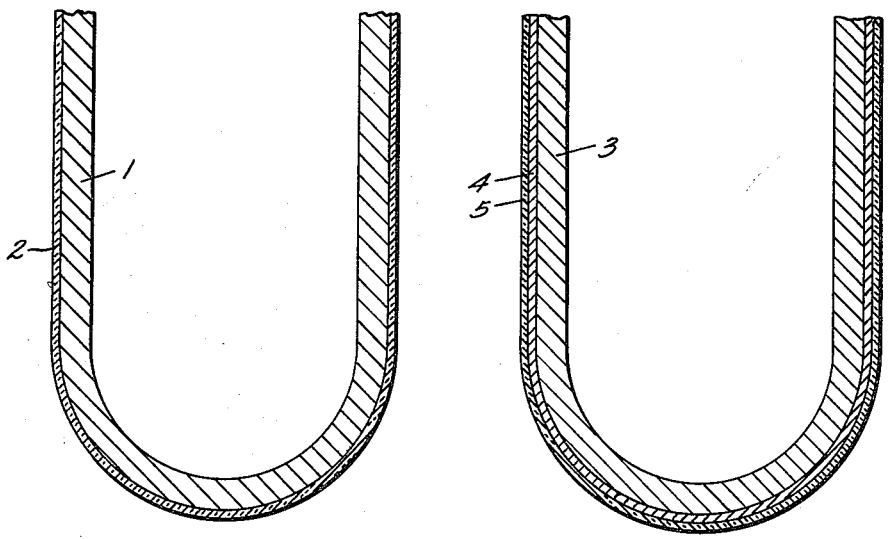
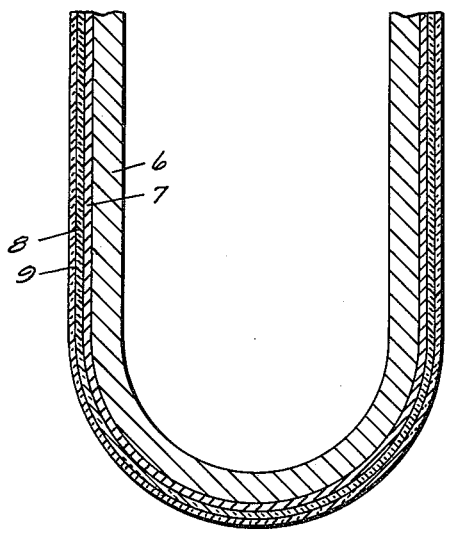
INVENTOR.
JOSEPH E. JAPKA
BY
ATTORNEY—

3,106,493
THERMOCOUPLE
Joseph E. Japka, Cincinnati, Ohio, assignor to General
Electric Company, a corporation of New York
Filed May 5, 1961, Ser. No. 108,146
3 Claims. (Cl. 136—4)

The present invention relates to thermocouples and more particularly relates to immersion thermocouples. More specifically, the present invention is concerned with a new improved protective sheath for immersion thermocouples of the type used to measure temperatures of fluids which may be damaging to the metals comprising the thermocouple.

The proper operation, as indeed the successful conclusion of a variety of technological endeavors frequently requires a precise measurement and monitoring of temperatures of fluid media. Use of thermocouples in such pursuits has long been known, and has been well established in the field of temperature measurement and control. Often, however, it becomes necessary to measure temperatures of fluids which are of such a nature as to be corrosive or in some way detrimental to the metals which comprises the thermocouple.

An extremely difficult problem has been encountered in the measurement of temperatures of a variety of molten metal materials, and particularly molten materials whose temperatures are of the order of 3000° F. A partial solution to this problem has been afforded by the use of optical pyrometers which, unfortunately, are generally accurate only within the range of + and −30° F. Also, variations in thermal emissivity may cause inaccuracies up to + and −100° F. in observation on different fluids. In cases where the metal whose temperature is sought to be measured is covered with a slag blanket, even this accuracy may not be attained, however. Consequently, and in applications requiring precise measurement and control, the use of thermocouples has become an important expedient.

A second approach to this basic problem, as shown by the U.S. Patent 2,915,575 to Thomas, has been the provision of a protective body or sheath about that portion of the thermocouple which would be immersed in the pernicious fluid. Some coatings or sheaths have been provided by employing substances such as, for example, graphite and conventional ceramic materials, such as silica. Two rather serious limitations exist in the use of the currently employed materials, however. In many cases, and especially when operating at temperatures of the order of 3000° F., the insulating or protective materials themselves are rapidly attacked, and destroyed by the molten medium. Accordingly, a variety of the materials used are entirely unsatisfactory at these temperatures for the length of time necessary for even one temperature measurement.

A second problem appurtenant the use of these conventional materials has been the rather limited duration of utility of the protective sheaths produced therefrom at these high temperatures. For example, even the most satisfactory sheath materials such as fused silica have been unable to withstand more than one, or at the most two high temperature determinations. When operating with metals necessitating vacuum induction melting, this problem has become especially acute. In such cases, it becomes necessary to "break vacuum" after a single immersion for the purpose of replacing the thermocouple sheath, a step which may be both a costly and a burdensome requirement.

Accordingly, it is a primary object of the present invention to provide a new and improved protective sheath so that a thermocouple may be employed in determining temperatures of the order of 3000° C.

A further object of the present invention it to provide such a protective sheath which may be employed in determining the temperatures of molten metals detrimental to the thermocouple metals.

Still another object of the present invention is to provide a new and improved protective body for a thermocouple so that the thermocouple has greatly increased operating life when employed in determining the temperatures of fluid media, detrimental or destructive to the thermocouple metals at temperatures of the order to 3000° F.

Briefly stated, these and other objects which will appear hereinafter are attained in accordance with the present invention by providing a hollow body closed at one end and having an outer composite coating bonded with a surface of at least one of the metals molybdenum, tungsten, tantalum, rhenium and their alloys. The coating consists of a first portion of alumina bonded with the surface and an outer portion of zircon bonded with the alumina portion, the metal having a co-efficient of thermal expansion substantially similar to that of the composite coating so that thermal shock will not cause loosening of the bond between the surface and the coating.

Still other objects and advantages will be apparent from the specification and claims, and from the accompanying drawing in which:

FIG. 1 is an enlarged fragmentary sectional view of a hollow tubular body used to enclose a thermocouple element;

FIG. 2 is an enlarged fragmentary sectional view of a hollow tubular body used to enclose a thermocouple element, and FIG. 3 is an enlarged fragmentary sectional view of a hollow tubular body used to enclose a thermocouple element which forms an embodiment of the present invention.

Referring now more particularly to the drawing, FIG. 1 illustrates an enlarged section of a hollow tubular metallic body 1 containing a thermocouple element (not shown) and coated with an adherent layer 2 of alumina. Although the use of metals and particularly those selected from the group including molybdenum, tungsten, tantalum, rhenium and their alloys for the hollow body is preferable, because of their thermal expansion characteristics, a variety of other materials, such as, for example, high alumina content ceramic bodies as well as zircon porcelains may also be used for this purpose. It is emphasized, however, that the use of metals having high melting points and the stated thermal expansion characteristics may be particularly advantageous since their use affords the provision of a relatively thin walled tubular body characterized by fine thermal and shock resistant properties.

As shown in FIG. 1, the hollow tubular body 1 is constructed of molybdenum having layer 2 of alumina deposited and bonded thereon. The protective alumina coating may be provided by flame spraying a layer or portion (preferably 0.007 inch–0.014 inch) of alumina directly onto the exterior surface of the hollow tubular body which is to contain the thermocouple element. Alternatively, and in order to promote the adhesion of the alumina coating, the tubular body may first be grit blasted so as to provide a more receptive base for the subsequently applied alumina.

FIG. 2 shows an enlarged section of a hollow tubular thermocouple containing metallic body 3 which has been precoated with an initial layer 4 of molybdenum, prior to the provision of the protective alumina coating 5.

Unexpectedly, it was discovered that when the hollow body which housed the thermocouple element was first provided with a bonded layer of at least one metal selected from the group consisting of molybdenum, tungsten, tantalum, rhenium and their alloys prior to the application of the protective alumina coating, the operative life of the thermocouple thus obtained was considerably extended. Thus, a molybdenum tube having a layer of molybdenum or tungsten bonded thereon, and a subsequent layer of alumina bonded thereover was discovered to function more successfully at high temperatures than a molybdenum tube coated directly with the protective alumina layer. Accordingly, and in a preferred mode of the present invention, a molybdenum body may be coated with a bonded molybdenum layer, a tungsten body with a tungsten layer etc. Alternatively, the body may be constructed of tungsten, and a molybdenum layer bonded thereon. Of course, it would also be within the spirit of the invention to employ a body constructed of two or more of the preferred metals and have a coating of either one, two, or more of those preferred metals bonded thereon. Prior to the application of this metallic layer, and as in the case of applying the alumina coating directly to the body, the exterior surface of the body may first be grit blasted so as to provide an irregular surface, and thereby promote adhesion of the subsequently bonded metallic coating. The metal layer may be applied by any of the conventional coating methods well known in the art, such as, for example, dipping or electroplating. It has been found highly advantageous, however, to bond this metal layer by means of flame spraying, which has been found to result in a particularly fine, tenacious coating receptive to the subsequently applied alumina layer. In general, it is preferred that this metallic coating be applied in thicknesses ranging from less than 0.001 inch up to and including 0.005 inch. Thicknesses of 0.003 inch or less are specifically preferred.

FIG. 3 shows an enlarged section of a hollow tubular metallic body 6 constructed of tantalum, and which contains a thermocouple element (not shown). A first coating of molybdenum 7 overlays and is bonded with the hollow body 6. This molybdenum coating is itself covered and bonded with a layer 8 of alumina. Overlaying and bonded with layer 8 is a thin film 9 of zircon which is seen to envelop the entire coated tubular body. In this regard, it was discovered that subsequent to the application of the alumina over either an uncoated, or metal coated hollow tubular body, a coating of zircon (ZrSiO$_4$) may be applied so as to act as an anti-wetting agent, and thus prevent molten metal in which the thermocouple may be immersed from adhering to the coated body after removal of the thermocouple from the molten bath. The zircon may preferably be bonded by flame spraying a layer of that material directly over the alumina coating. Layers ranging in thicknesses of from 0.001 inch to 0.003 inch are preferred for the purpose specified.

In direct contradistinction to the protectively coated or encased thermocouples of the prior art which may be immersed in molten metals at temperatures of 3000° F. only once or twice, the new and improved thermocouples prepared in accordance with the present invention have been successfully immersed in molten metals at temperatures of up to 3200° F. in vacuum, inert or reducing atmospheres without failure, and for a repeated number of immersions. The average life, or time for which the thermocouples prepared in accordance with the present invention may be employed in molten metal baths whose temperatures were of the order of 3200° F. was found to be in excess of 15 and up to 25 immersions for periods of up to about 60 minutes per immersion.

*Example 1*

A hollow molybdenum tube ¼ inch diameter by 6 inches long, closed at one end was first grit blasted and then flame sprayed with molybdenum powder to a thickness of 0.002 inch. A 0.008–0.010 inch coating of alumina was then bonded to the molybdenum coating by flame spraying and a coating of zircon 0.002 inch thick was then bonded to the alumina by flame spraying. Thus the hollow molybdenum tube was coated with a composite coating bonded together and to the tube and consisting of a first 0.002 inch portion or layer of molybdenum, a second 0.008–0.010 inch portion of alumina and a third 0.002 inch portion of zircon.

Thermocouple wires of the platinum-10% rhodium type were insulated and sealed in the tube according to standard practice. The entire thermocouple including the protective sheath or tube was immersed in a liquid metal consisting by weight of 15–18% Ni, 18–20% cr, 7–9% Si, 3.5–4.5% W with the balance essentially cobalt. The sheath was immersed in the liquid metal at temperatures between 2300–2500° F. for 59 minutes without failure. During this time the alloy was solidified six times for periods of 1–2 minutes, the purpose being to measure the liquidus and solidus points of the alloy with various boron additions. At the end of this usage the sheath was essentially unaffected and available for further use. The best available protective systems have failed in this type of operation after only one or two cycles.

In another test, a sheath coated as in this example was used for 29 immersions at a total immersion time of over 6 hours before it was retired from service without failure.

*Example 2*

A hollow tantalum tube was grit blasted and flame sprayed as in Example 1 with the following coating bonded together and to the tube: a first 0.003 inch portion of molybdenum, a second 0.010 inch portion of alumina and a third 0.001 inch portion of zircon. The tube was still in use after 7 dips with a total immersion time of 198.4 minutes in a liquid metal at about 2500° F.

The several advantages attendant the use of the new and improved protective sheath of the present invention will become obvious to those skilled in the art. Primarily, however, it is emphasized that the protective sheath of the present invention may be used repeatedly at temperatures of up to 3200° F. without replacement. Moreover, the particular coatings utilized (i.e. alumina and zircon) do not contaminate the molten metal whose temperature is sought to be measured. Further, the use or damaged protective sheath may easily be repaired by removing the coating and simply following the original technique of manufacture.

It should be understood, that although the new and improved protective sheath of the present invention have particular utility in the measurement of temperatures of molten metals, they may, in addition, be useful in the measurement of temperatures of a variety of fluids which may be particularly detrimental to the metals constituting a thermocouple element. Further, it should be understood that the present invention is not to be considered limited to any of the specific embodiments herein described, but may be used in other ways without departure from the spirit of the invention and the scope of the appended claims.

What is claimed is:
1. A hollow protective thermocouple sheath, closed at one end, comprising:
   a metallic body;
   a metallic first coating bonded with an outer surface of body,
      the metallic body and the metallic first coating being of at least one metal selected from the group consisting of molybdenum, tungsten, tantalum, rhenium and their alloys; and
   a composite second coating bonded with an outer surface of the metallic first coating, the composite second coating consisting essentially of:
      an inner alumina portion bonded with said outer surface, and
      an outer zircon portion bonded with the inner alumina portion.

2. A hollow protective thermocouple sheath, closed at one end, comprising:
   a molybdenum body;
   a molybdenum first coating bonded with an outer surface of the molybdenum body; and
   a composite second coating bonded with an outer surface of the molybdenum first coating, the composite second coating consisting essentially of:
      an inner alumina portion bonded with said outer surface, and
      an outer zircon portion bonded with the inner alumina portion.

3. A hollow protective thermocouple sheath, closed at one end, comprising:
   a tantalum body;
   a molybdenum first coating bonded with an outer surface of the tantalum body; and
   a composite second coating bonded with an outer surface of the molybdenum first coating, the composite second coating consisting essentially of:
      an inner alumina portion bonded with said outer surface, and
      an outer zircon portion bonded with the inner alumina portion.

References Cited in the file of this patent

UNITED STATES PATENTS

| | | |
|---|---|---|
| 1,651,750 | Brophy | Dec. 6, 1927 |
| 1,773,825 | Simms | Aug. 26, 1930 |
| 1,773,826 | Simms | Aug. 26, 1930 |
| 2,517,053 | Thompson | Aug. 1, 1950 |
| 2,802,894 | Schneider et al. | Aug. 13, 1957 |
| 2,843,646 | Conant | July 15, 1958 |
| 2,915,575 | Thomas | Dec. 1, 1959 |
| 2,948,766 | Schneider et al. | Aug. 9, 1960 |